(12) United States Patent
Higano et al.

(10) Patent No.: US 11,796,725 B2
(45) Date of Patent: Oct. 24, 2023

(54) METAL OXIDE MICROPARTICLES, METHOD FOR PRODUCING SAME, DISPERSION FOR FORMING INFRARED-SHIELDING FILM, METHOD FOR PRODUCING SAME, METHOD FOR FORMING INFRARED-SHIELDING FILM, AND BASE MATERIAL HAVING INFRARED-SHIELDING FILM

(71) Applicant: MITSUBISHI MATERIALS CORPORATION, Tokyo (JP)

(72) Inventors: Satoko Higano, Naka (JP); Miho Shoji, Naka (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 120 days.

(21) Appl. No.: 16/771,831

(22) PCT Filed: Mar. 18, 2019

(86) PCT No.: PCT/JP2019/011114
§ 371 (c)(1),
(2) Date: Jun. 11, 2020

(87) PCT Pub. No.: WO2019/181833
PCT Pub. Date: Sep. 26, 2019

(65) Prior Publication Data
US 2021/0191016 A1    Jun. 24, 2021

(30) Foreign Application Priority Data
Mar. 22, 2018 (JP) .................. 2018-053819

(51) Int. Cl.
G02B 5/26 (2006.01)
C09C 3/08 (2006.01)
(Continued)

(52) U.S. Cl.
CPC .............. *G02B 5/26* (2013.01); *C09C 1/00* (2013.01); *C09C 1/0096* (2013.01); *C09C 3/08* (2013.01);
(Continued)

(58) Field of Classification Search
None
See application file for complete search history.

(56) References Cited

U.S. PATENT DOCUMENTS 5,993,861 A    11/1999  Fogel
2004/0192951 A1*  9/2004  Sawada ............... C07C 51/412
556/105

(Continued)

FOREIGN PATENT DOCUMENTS

CN    1872917 A    12/2006
CN    101962516 A    2/2011
(Continued)

OTHER PUBLICATIONS

Shaojuan Luo et al., "Synthesis and application of non-agglomerated ITO nanocrystals via pyrolysis of indium-tin stearate without using additional organic solvents," J Nanopart Res vol. 16(8) 2014, 2561 pp. 1-12.
(Continued)

*Primary Examiner* — Ronak C Patel
(74) *Attorney, Agent, or Firm* — Locke Lord LLP; James E. Armstrong, IV; Nicholas J. DiCeglie, Jr.

(57) ABSTRACT

In these metal oxide microparticles, surfaces of microparticles of a metal oxide are modified by a fatty acid having 5 or more and 14 or less carbon atoms and having a branched chain, the metal oxide is metal oxides of a plurality of kinds of metals selected from the group consisting of Zn, In, Sn, and Sb, and an average particle diameter of the microparticles is 80 nm or less. In a dispersion for forming an
(Continued)

infrared-shielding film, the metal oxide microparticles are dispersed in a hydrophobic solvent, and a light transmittance in a wavelength range of 800 nm to 1,100 nm is 20% or more and less than 70%.

10 Claims, 1 Drawing Sheet

(51) Int. Cl.
    *C09C 1/00* (2006.01)
    *C09D 5/00* (2006.01)
    *C09D 7/62* (2018.01)
    *G02B 5/20* (2006.01)

(52) U.S. Cl.
    CPC .............. *C09D 5/00* (2013.01); *C09D 7/62* (2018.01); *G02B 5/208* (2013.01); *C01P 2004/64* (2013.01); *C01P 2006/60* (2013.01)

(56) References Cited

U.S. PATENT DOCUMENTS

| | | | |
|---|---|---|---|
| 2006/0211152 | A1 | 9/2006 | Peng et al. |
| 2015/0160379 | A1 | 6/2015 | Shen et al. |
| 2015/0291501 | A1 | 10/2015 | Yang et al. |
| 2016/0317992 | A1* | 11/2016 | Thuo .................... B82Y 40/00 |

FOREIGN PATENT DOCUMENTS

| | | | |
|---|---|---|---|
| CN | 102251285 A | 11/2011 | |
| CN | 102470090 A | 5/2012 | |
| CN | 102498169 A | 6/2012 | |
| CN | 102791870 A | 11/2012 | |
| CN | 104725900 A | 6/2015 | |
| CN | 107162044 A | 9/2017 | |
| EP | 3578515 A1 | 12/2019 | |
| JP | H05-070717 A | 3/1993 | |
| JP | H07-109119 A | 4/1995 | |
| JP | H08-041441 A | 2/1996 | |
| JP | 10-265718 A | 10/1998 | |
| JP | 2002-015631 A | 1/2002 | |
| JP | 2004-300539 A | 10/2004 | |
| JP | 2005-154654 A | 6/2005 | |
| JP | 2007-145712 A | 6/2007 | |
| JP | 2008-074911 A | 4/2008 | |
| JP | 2008-521591 A | 6/2008 | |
| JP | 2008-266050 A | 11/2008 | |
| JP | 2008-297414 A | 12/2008 | |
| JP | 2010-240520 A | 10/2010 | |
| JP | 2012-176859 A | 9/2012 | |
| JP | 2013-001954 A | 1/2013 | |
| JP | 2013-089533 A | 5/2013 | |
| JP | 2013-216858 A | 10/2013 | |
| JP | 2014-145050 A | 8/2014 | |
| JP | 2015-003940 A | 1/2015 | |
| JP | 2015-003941 A | 1/2015 | |
| JP | 2015-511575 A | 4/2015 | |
| JP | 2016-118679 A | 6/2016 | |
| JP | 2017-024932 A | 2/2017 | |
| TW | 201336786 A | 9/2013 | |
| WO | 2006/057467 A1 | 6/2006 | |
| WO | 2006/098756 A2 | 9/2006 | |
| WO | 2017/217459 A1 | 12/2017 | |
| WO | 2018/143076 A1 | 8/2018 | |

OTHER PUBLICATIONS

International Search Report dated Jun. 18, 2019, issued for PCT/JP2019/011114 and English translation thereof.
Shaojuan Luo, et al., "Synthesis and application of non-agglomerated ITO nanocrystals via pyrolysis of indium-tin stearate without using additional organic solvents", Journal of Nanoparticle Research, vol. 16(8), 2014, 2561, pp. 1 to 12.
International Search Report dated Mar. 6, 2018, issued for PCT/JP2018/002448 and English translation thereof.
Shaojuan Luo et al., "Effect of fatty acid on the formation of ITO nanocrystals via one-pot pyrolysis reaction", CrystEngComm, vol. 17, No. 5, 2015, pp. 1168-1172.
Notice of Allowance dated Jul. 7, 2020, issued for Japanese Patent Application No. 2017-019315 and English translation thereof.
Supplementary European Search Report dated Nov. 23, 2020, issued for European Patent Application No. 18747384.8.
Office Action dated Dec. 29, 2020, issued for Taiwanese Patent Application No. 107103555 and English translation thereof.
Notice of Allowance dated Apr. 12, 2021, issued for Korean Patent Application No. 10-2019-7019650 and English translation thereof.
International Search Report daated Mar. 19, 2019, issued for PCT/JP2019/004426 and English translation thereof.
Office Action dated Oct. 21, 2021, issued for U.S. Appl. No. 16/482,804.
Office Action dated Nov. 2, 2021, issued for Japanese Patent Application No. 2018-053819 and English translation thereof.
Matsui Hiroaki et al., "Infrared Solar Thermal-Shielding Applications Based on Oxide Semiconductor Plasmonics", Nanoplasmonics—Fundamentals and Applications, Chapter 8, IntechOpen, Jun. 21, 2017, pp. 173-193 and cover page. (cited in the Nov. 26, 2021 Search Report issued for EP19770894.4).
Supplementary European Search Report dated Nov. 26, 2021, issued for European Patent Application No. 19770894.4.
Qianqian Dou et al., "Synthesis of various metal stearates and the corresponding monodisperse metal oxide nanoparticles" Powder Technology, 2016, pp. 949-958.
Office Action issued in corresponding Chinese Patent Application No. CN 201980007579.5?, dated Mar. 1, 2022.
Office Action issued in corresponding Taiwanese Patent Application No. TW 108109506, dated Mar. 31, 2022.
Notice of Allowance dated Jul. 20, 2021, issued for Japanese Patent Application No. 2018-023647 and English translation thereof.
Supplementary European Search Report dated Oct. 20, 2021, issued for European Patent Application No. 19753901.8.
Boubbou, Journal of Nanomaterials (2015) 620672/1-620672/12. 1687-4129.
Restriction Requirement issued in U.S. Appl. No. 16/770,964, dated May 17, 2022.

\* cited by examiner

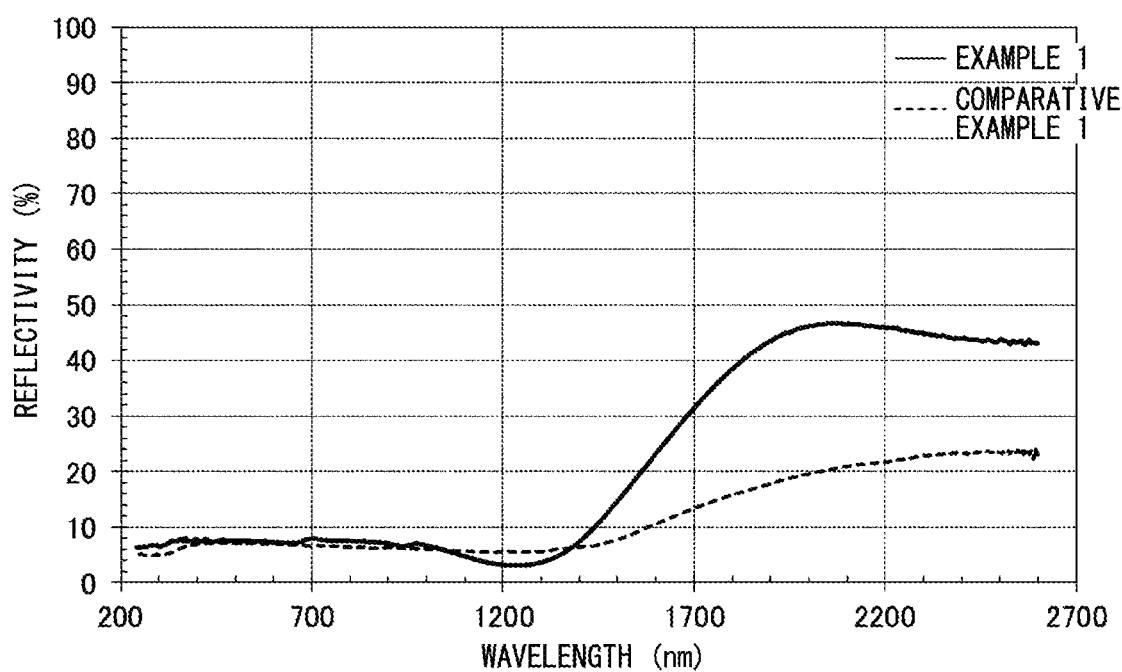

METAL OXIDE MICROPARTICLES, METHOD FOR PRODUCING SAME, DISPERSION FOR FORMING INFRARED-SHIELDING FILM, METHOD FOR PRODUCING SAME, METHOD FOR FORMING INFRARED-SHIELDING FILM, AND BASE MATERIAL HAVING INFRARED-SHIELDING FILM

TECHNICAL FIELD

The present invention relates to metal oxide microparticles having a microparticle surface modified by a fatty acid and a method for producing the same. In addition, the present invention relates to a dispersion for forming an infrared-shielding film including the metal oxide microparticles and a method for producing the same. Furthermore, the present invention relates to a method for forming an infrared-shielding film using the dispersion and a base material having an infrared-shielding film.

Priority is claimed on Japanese Patent Application No. 2018-053819, filed Mar. 22, 2018, the content of which is incorporated herein by reference.

BACKGROUND ART

As a method for obtaining metal oxide microparticles having a microparticle surface modified by a fatty acid, for example, in Non Patent Literature 1, a method in which stearic acid, which is one kind of fatty acid, metallic indium, and metallic tin are directly reacted with each other in a nitrogen atmosphere at 260° C. for 3 hours to synthesize an indium-tin stearate compound, which is a precursor of indium-doped tin oxide (ITO) primary particles and this precursor is thermally decomposed is reported. According to this method, ITO primary particles that do not agglomerate together and have a particle diameter of 7 nm or less can be obtained without adding an organic solvent.

CITATION LIST

Non Patent Literature

[Non Patent Literature 1]
Shaojuan Luo et al. "Synthesis and application of non-agglomerated ITO nanocrystals via pyrolysis of indium-tin stearate without using additional organic solvents" J Nanopart Res Vol. 16(8) 2014, 2561 pp. 1 to 12

SUMMARY OF INVENTION

Technical Problem

The stearic acid used in Non Patent Document 1 is considered to modify the surfaces of the finally-obtained ITO primary particles and serve as a protective group.

However, stearic acid is a relatively long chain fatty acid having 18 carbon atoms, and thus the ITO primary particles covered with stearic acid as the protective group are likely to have broad particle intervals. Therefore, in the case of producing an infrared-shielding film using these ITO primary particles, there has been a problem in that an infrared-shielding effect is not sufficient.

An object of the present invention is to provide metal oxide microparticles for forming a film having high infrared-shielding performance and high transparency and a method for producing the same. Another object of the present invention is to provide a dispersion for forming an infrared-shielding film which is excellent in terms of long-term stability when made into a dispersion of the above-described metal oxide microparticles and from which a film having high infrared-shielding performance can be obtained when the film is formed by applying the dispersion and a method for producing the same. Still another object of the present invention is to provide a method for forming an infrared-shielding film having high infrared-shielding performance using the above-described dispersion and a base material having an infrared-shielding film.

Solution to Problem

A first aspect of the present invention is metal oxide microparticles, in which surfaces of microparticles of a metal oxide are modified by a fatty acid having 5 or more and 14 or less carbon atoms and having a branched chain, the metal oxides are oxides of a plurality of kinds of metal selected from the group consisting of Zn, In, Sn, and Sb, and an average particle diameter of the microparticles is 80 nm or less.

A second aspect of the present invention is a method for producing the metal oxide microparticles according to the first aspect, comprising: a step of preparing a mixture of a plurality of kinds of fatty acid metallic salts by mixing a fatty acid having 5 or more and 14 or less carbon atoms and having a branched chain and a metallic source including a plurality of kinds of metals selected from the group consisting of Zn, In, Sn, and Sb, oxides of the metals, or hydroxides of the metals; a step of obtaining a metallic soap, which is a precursor, by heating the mixture at a temperature of a melting temperature or higher of the fatty acid and a temperature lower than a decomposition temperature of the fatty acid; and a step of producing the metal oxide microparticles of the first aspect by heating the precursor at a temperature of a melting temperature or higher of the precursor and a temperature lower than a decomposition temperature of the precursor.

A third aspect of the present invention is a dispersion for forming an infrared-shielding film in which the metal oxide microparticles of the first aspect are dispersed in a hydrophobic solvent, in which a light transmittance of the dispersion for forming an infrared-shielding film in a wavelength range of 800 nm to 1,100 nm is 20% or more and less than 70%.

A fourth aspect of the present invention is a method for producing a dispersion for forming an infrared-shielding film, comprising: a step of mixing the metal oxide microparticles of the first aspect or metal oxide microparticles produced by the method of the second aspect and a hydrophobic solvent, in which a light transmittance of the dispersion for forming an infrared-shielding film in a wavelength range of 800 nm to 1,100 nm is 20% or more and less than 70%.

A fifth aspect of the present invention is a method for forming an infrared-shielding film, comprising: a step of forming an infrared-shielding film by applying the dispersion for forming an infrared-shielding film of the third aspect or a dispersion for forming an infrared-shielding film produced by the method of the fourth aspect onto a transparent base material.

A sixth aspect of the present invention is a base material having an infrared-shielding film, comprising: a transparent base material and an infrared-shielding film formed on the base material, in which the base material having an infrared-shielding film has a light transmittance of 70% or more in a wavelength range of 380 nm to 780 nm, a light reflectivity of 10% or more in a wavelength range of 1,500 nm to 2,500 nm, and a maximum value of a light reflectivity in a wavelength range of 1,500 nm to 2,500 nm in a case where the light reflectivity is measured in a wavelength range of 240 nm to 2,600 nm.

A seventh aspect of the present invention is an invention based on the sixth aspect and is a base material having an infrared-shielding film having, on the infrared-shielding film, a resin film transparent to visible light or a glass layer transparent to visible light.

Advantageous Effects of Invention

The metal oxide microparticles of the first aspect of the present invention are made of the particles of a metal oxide having an average particle diameter of 80 nm or less and having a predetermined composition. In addition, the surfaces are modified by the relatively short chain fatty acid having 5 or more and 14 or less carbon atoms. Therefore, first, the particles are transparent, second, the relatively short chain fatty acid serves as a protective group, and the metal oxide microparticles, which are primary particles, do not easily agglomerate. Third, when the metal oxide microparticles turn into secondary particles, the metal oxide microparticles can be lined with each other at short inter-particle distances. From these facts, a surface plasmon effect between the metal oxide microparticles is developed. That is, the collective vibration of electrons in the metal oxide configuring the metal oxide microparticles is likely to be induced by incident light having a specific wavelength, and localized plasmon resonance is likely to occur. When localized plasmon resonance occurs, absorption and scattering at the specific wavelength increase, and the reflectivity improves due to scattered light from the respective microparticles. When a film is made using a dispersion in which the above-described metal oxide microparticles are dispersed, due to the above-described effect, the reflectivity in an infrared wavelength range further increases, and the infrared-shielding performance is enhanced. In addition the visible light transmittance of this film increases.

In the method for producing the metal oxide microparticles of the second aspect of the present invention, the fatty acid has a branched chain, and thus there is an effect for increasing the reaction rate when the mixture of the metallic source and the fatty acid is heated at a predetermined temperature. In addition the metallic soap, which is the precursor, is heated at a predetermined temperature, whereby the precursor melts, and metal oxide microparticles, which are primary particles, are generated and dispersed in the melt. Here the surfaces of the generated metal oxide microparticles are modified by the fatty acid, and the fatty acid serves as a protective group, and thus metal oxide microparticles that do not easily agglomerate together, have an average particle diameter of 80 nm or less, and have the above-described effect can be obtained.

In the dispersion for forming an infrared-shielding film of the third aspect and the method for producing a dispersion for forming an infrared-shielding film of the fourth aspect of the present invention, the metal oxide microparticles are transparent, and the surfaces thereof are modified by the fatty acid, and thus the metal oxide microparticles are stably dispersed in a hydrophobic solvent in a primary particle state without agglomerating together. Therefore, this dispersion is transparent, and the light transmittance in a wavelength range of 800 nm to 1,100 nm is 20% or more and less than 70%.

In the method for forming an infrared-shielding film of the fifth aspect of the present invention, an infrared-shielding film is formed by applying the dispersion onto a transparent base material. This formed infrared-shielding film becomes a highly transparent film.

In addition, the base material having an infrared-shielding film of the sixth aspect has the above-described infrared-shielding film on the base material and thus has a light transmittance of 70% or more in a wavelength range of 380 nm to 780 nm, a light reflectivity of 10% or more in a wavelength range of 1,500 nm to 2,500 nm, and a maximum value of a light reflectivity in a wavelength range of 1,500 nm to 2,500 nm in a case where the light reflectivity is measured in a wavelength range of 240 nm to 2,600 nm.

The base material having an infrared-shielding film of the seventh aspect of the present invention has the resin film transparent to visible light or the glass layer transparent to visible light on the infrared-shielding film, and thus it becomes possible to protect the infrared-shielding film from deterioration or the like caused by a damage or an environment while the base material having an infrared-shielding film remains visually transparent.

BRIEF DESCRIPTION OF DRAWING

FIG. 1 is spectral curves showing a light reflectivity of base materials having an infrared-shielding film in which the infrared-shielding films are formed using metal oxide microparticle dispersions obtained in Example 1 of the present invention and Comparative Example 1.

DESCRIPTION OF EMBODIMENTS

Next an embodiment for carrying out the present invention will be described with reference to a drawing.
<Metal Oxide Microparticles>

In metal oxide microparticles of the present embodiment, surfaces thereof are modified by a fatty acid having 5 or more and 14 or less carbon atoms and having a branched chain, metal oxides of these microparticles are oxides of a plurality of kinds of metal selected from the group consisting of Zn, In, Sn, and Sb, and an average particle diameter thereof is 80 nm or less. When the average particle diameter of the metal oxide microparticles exceeds 80 nm, the dispersion stability of the metal oxide microparticles in a solvent for final dispersion is impaired, the microparticles settle within a short period of time or the transparency of the dispersion disappears, and the dispersion becomes cloudy. A preferred average particle diameter of the metal oxide microparticles is 5 nm to 50 nm. The average particle diameter of the metal oxide microparticles is obtained by measuring the particle diameters of 300 particles from an image captured using a transmission electron microscope (JEOL Ltd., trade name: JEM-2010F) at a magnification of 100,000 times using software (trade name: ImageJ) and computing the average thereof.
[Fatty Acid]

The fatty acid modifying the surfaces of the metal oxide microparticles has 5 or more and 14 or less carbon atoms ($C_nH_{2n}O_2$, n=5 to 14) and has a branched chain. The fatty acid has a branched chain, and thus the reaction rate increases when a mixture of a metallic source and the fatty acid is heated at a predetermined temperature in order to produce metal oxide microparticles described below. When the number n of carbon atoms is 4 or less, in the case of producing a dispersion of the finally obtained metal oxide microparticles, the dispersion stability thereof becomes poor. In addition when the number n of carbon atoms exceeds 15, in the metal oxide microparticles covered with the fatty acid having more than 15 carbon atoms as the protective group, the particle intervals become broad when the particles are lined with each other, and, in the case of producing an infrared-shielding film using these metal oxide microparticles, an infrared-shielding effect is poor. The number n of carbon atoms is preferably 6 to 10. Specific examples of the fatty acid are shown in Table 1.

TABLE 1

| Number of carbon atoms | Kind of fatty acid ($C_nH_{2n}O_2$) having branched chain |
|---|---|
| n = 5 | 3-Methylbutanoic acid |
| | 2-Methylbutanoic acid |
| | 2,2-Dimethylpentanoic acid |
| n = 6 | 4-Methylpentanoic acid |
| | 3-Methylpentanoic acid |
| | 2-Methylpentanoic acid |
| | 2,2-Dimethylbutanoic acid |
| | 3,3-Dimethylbutanoic acid |
| n = 7 | 4-Methylhexanoic acid |
| | 2-Methylhexanoic acid |
| | 5-Methylhexanoic acid |
| | 3,3-Dimethylpentanoic acid |
| n = 8 | 2-Ethylhexanoic acid (octylic acid) |
| | 3,3-Dimethylhexanoic acid |
| | 2,2-Diethylbutanoic acid |
| n = 9 | 4-Methyloctanoic acid |
| | 3-Ethylheptanoic acid |
| | 3,3-Dimethylheptanoic acid |
| | 7-Methyloctanoic acid |
| | 2-Methyloctanoic acid |
| | 2-Ethylheptanoic acid |
| | 7-Methyloctanoic acid |
| | 3,3-Diethylpentanoic acid |
| n = 10 | 4-Ethyloctanoic acid |
| | 2-Butylhexanoic acid |
| | 2,7-Dimethyloctanoic acid |
| | 2,2-Dimethyloctanoic acid |
| | 2-Ethyloctanoic acid |
| | Neodecanoic acid |
| n = 11 | 6-Methyldecanoic acid |
| | 2,5-Diethylpentanoic acid |
| | 4,4-Diethylheptanoic acid |
| | 3,3-Dimethylnonanoic acid |
| | 3-Methyldecanoic acid |
| n = 12 | Isoundecanoic acid |
| | 2,4-Dimethyldecanoic acid |
| | 3,3-Dimethyldecanoic acid |
| | 2-Methylundecanoic acid |
| | 2-Butyloctanoic acid |
| n = 13 | 11-Methyldodecanoic acid |
| | 2-Methyldodecanoic acid |
| n = 14 | 3,3-Dimethyldodecanoic acid |
| | 11-Methyltridecano acid |

[Metal Oxide of Plurality of Kinds of Metals]

As metal configuring the metal oxide, a plurality of kinds of metals is selected from the group consisting of Zn, In, Sn, and Sb. In order to form a film having high infrared-shielding performance, it is necessary to use a plurality of kinds of metals, that is, two or more different kinds of metals as the metal. Three or more kinds of metals in a mixture form can also be used, but two different kinds of metals are preferred. For example, in the case of two kinds of metal: In and Sn, the metal is used in a mass ratio (In:Sn) of 80 to 95:20 to 5. In the case of two kinds of metal: Sb and Sn, the metal is used in a mass ratio (Sb:Sn) of 85 to 98:15 to 2. In the case of two kinds of metal: Zn and Sb, the metal is used in a mass ratio (Zn:Sb) of 85 to 98:15 to 2. As this metal oxide, indium doped tin oxide (ITO), antimony doped tin oxide (ATO), antimony doped zinc oxide (AZO), and the like are exemplified.

<Method for Producing Metal Oxide Microparticles>

The metal oxide microparticles of the present embodiment are produced by mixing the fatty acid and a metallic source including one or more kinds of a plurality of kinds of metals selected from the group consisting of Zn, In, Sn, and Sb, oxides of the metals, and hydroxides of the metals to prepare a mixture of a plurality of kinds of fatty acid metallic salts, heating the mixture at a temperature of a melting temperature or higher of the fatty acid and a temperature lower than a decomposition temperature of the fatty acid to obtain a metallic soap, which is a precursor, and then heating the precursor at a temperature of a melting temperature or higher of the precursor and a temperature lower than a decomposition temperature of the precursor.

In a case where three or more kinds of metallic elements configure the metal, the metal oxide, or the metal hydroxide, in the above-described combination examples of two kinds of metal, a part of the mass ratio of the second most element needs to be substituted with a third or later element.

[Metallic Source of Starting Raw Material]

The metallic source of the present embodiment is the plurality of kinds of metals selected from the group consisting of Zn, In, Sn, and Sb, the metal oxides thereof, or the metal hydroxides thereof.

[Synthesis of Precursor]

The above-described fatty acid and the plurality of kinds of metallic sources are directly mixed and reacted together, thereby synthesizing a metallic soap, which is a precursor of metal oxide microparticles that is a final product. The fatty acid and the metallic source are preferably stirred and mixed together by adding the metallic source to the fatty acid already in a molten state. Regarding the mixing ratio, with respect to 100% by mass of the fatty acid, the metallic component is preferably added to the metallic source in a ratio of 5% by mass to 40% by mass and more preferably added in a ratio of 10% by mass to 30% by mass. When the metallic component is less than 5% by mass, there is a disadvantage that a large amount of the unreacted fatty acid remains, and, when the metallic component exceeds 40% by mass, there is a disadvantage that the metallic component not contributing to the reaction is generated as a by-product.

The mixture obtained by mixing the fatty acid and the metallic source is heated at a temperature of 130° C. to 250° C. and preferably 150° C. to 230° C., which is the melting temperature or higher of the fatty acid and lower than the decomposition temperature of the fatty acid, and retained at this temperature for 1 hour to 5 hours in an inert gas atmosphere such as nitrogen or argon gas in a case where the metallic source is the metal or in an inert gas atmosphere such as nitrogen or argon gas or an atmospheric atmosphere in a case where the metallic source is the metal oxide or the metal hydroxide other than the metal. At a temperature lower than 130° C., the fluidity of the fatty acid is insufficient, and the fatty acid does not melt and is not sufficiently mixed with the metallic source. When the temperature exceeds 250° C., the fatty acid decomposes, and the metallic soap, which is the precursor, is not synthesized. The heating time and the heating retention time can be appropriately changed within the above-described ranges depending on the kind, mixing ratio to the fatty acid, or the like of the metallic source. With the above-described heating, the metallic soap, which is the precursor of metal oxide microparticles that is a final product, is synthesized.

[Production of Metal Oxide Microparticles]

The obtained precursor is heated at a temperature of 200° C. to 350° C. and preferably 230° C. to 310° C., which is the melting temperature or higher of the precursor and lower than the decomposition temperature of the precursor, and retained at this temperature for 0.5 hours to 8 hours. At a temperature of lower than 200° C., the precursor does not melt, particles are not generated, and metal oxide microparticles are not produced. When the temperature exceeds 350° C., the decomposition and carburization of the fatty acid occur at the same time as the decomposition of the precursor, and there is a disadvantage that metal oxide microparticles are not produced or the like. The heating time and the heating retention time can be appropriately changed within the above-described ranges depending on the kind of the precursor, the kind of the metallic source, or the like. With the above-described heating, metal oxide microparticles, which is a final product, are obtained. These metal oxide microparticles have the above-described average particle diameter, and the particle surfaces are modified by an organic protective group.

<Dispersion of Metal Oxide Microparticles>

In a dispersion of metal oxide microparticles of the present embodiment, the obtained metal oxide microparticles are dispersed in a hydrophobic solvent. The light transmittance of this dispersion in a wavelength range of 800 nm to 1,100 nm is 20% or more and less than 70%. This light transmittance is measured according to JIS standards (JIS 83216) using a spectrophotometer (Hitachi High-Tech Corporation, trade name: U-4100) after putting the dispersion into a glass cell having a light path length of 1 mm. The light transmittance is preferably 25% or more and 65% or less. At a transmittance of less than 20%, in an infrared-shielding film obtained using the dispersion, there is a disadvantage that coloration occurs due to absorption in the visible light range, and, when the light transmittance is 70% or more, in an infrared-shielding film obtained using the dispersion, there is a disadvantage that a sufficient shielding effect cannot be obtained.

<Method for Producing Dispersion of Metal Oxide Microparticles>

The obtained metal oxide microparticles are added to the hydrophobic solvent and stirred and mixed together, thereby producing the dispersion. As the hydrophobic solvent, mixtures of one or more kinds selected from benzene, cyclopropane, cyclohexane, octadecane, hexadecane, n-tetradecane, n-pentane, n-hexane, cyclohexane, p-xylene, toluene, kerosene, and the like are exemplified. The surfaces of the metal oxide microparticles are modified by the fatty acid, and thus the metal oxide microparticles are stably dispersed in the hydrophobic solvent. With respect to 100% by mass of the hydrophobic solvent, 5% by mass to 60% by mass of the metal oxide microparticles are preferably added to and mixed with depending on a method for applying the dispersion.

<Method for Forming Infrared-Shielding Film and Base Material Having Infrared-Shielding Film>

The obtained dispersion is applied to, for example, a surface of a transparent glass substrate or a surface of a transparent resin film, which is a transparent base material, dried at a predetermined temperature, and then heated, whereby an infrared-shielding film having a film thickness of 0.1 μm to 2.0 μm and preferably 0.2 μm to 1.5 μm is formed on the glass substrate surface or the resin film surface, and a base material having an infrared-shielding film is obtained. In a case where the base material is a transparent glass substrate, the heating treatment is carried out by retaining the dispersion in an oxidative atmosphere at a temperature of 50° C. to 300° C. for 5 minutes to 60 minutes. This temperature and this retention time are determined depending on an adhesion strength demanded for the film. In addition in a case where the base material is a transparent resin film, the heating treatment is carried out by retaining the dispersion in an oxidative atmosphere at a temperature of 40° C. to 120° C. for 5 minutes to 120 minutes. This temperature and this retention time are determined depending on an adhesion strength demanded for the film and the heat resistance of a foundation film.

A base material having an infrared-shielding film of the present embodiment is produced by, for example, applying the above-described dispersion onto a transparent base material and thus has a light transmittance of 70% or more in a wavelength range of 380 nm to 780 nm, a light reflectivity of 10% or more in a wavelength range of 1,500 nm to 2,500 nm, and the maximum value of a light reflectivity in a wavelength range of 1,500 nm to 2,500 nm in a case where the light reflectivity is measured in a wavelength range of 240 nm to 2,600 nm. The base material having an infrared-shielding film has infrared-shielding performance, which is the above-described feature, and has an optical characteristic of a visible light-transmitting property due to a surface plasmon effect between the metal oxide microparticles because the metal oxide microparticles configuring the produced infrared-shielding film are nanoparticles having an average particle diameter of 80 nm or less and a high light transmittance, the surfaces thereof are modified by the fatty acid having a relatively short chain length, and the particles are lined with each other at short distances. The light transmittance in the wavelength range of 380 nm to 780 nm is preferably 75% or more. At a light transmittance of less than 70%, there is a disadvantage that the transmitting property is poor, the visibility becomes bad, or the like. The light reflectivity in the wavelength range of 1,500 nm to 2,500 nm is preferably 15% or more and 65% or less. At a light reflectivity of less than 10%, there is a disadvantage that the infrared-shielding effect does not become sufficient.

The base material having an infrared-shielding film of the present embodiment may have the infrared-shielding film sandwiched between the base material and the resin film or the glass layer by providing a resin film transparent to visible light or a glass layer transparent to visible light on the infrared-shielding film formed on the base material.

In such a case, it becomes possible to protect the infrared-shielding film from deterioration or the like caused by a damage or an environment while the base material having an infrared-shielding film remains visually transparent. In a case where a resin film is provided in order to prevent the above-described effect from being impaired, the thickness is preferably set to 50 μm to 500 μm. In the case of providing a glass layer, the thickness is preferably set to 0.7 mm to 5 mm.

EXAMPLES

Next examples of the present invention will be specifically described together with comparative examples.

Example 1

As a fatty acid, 2-ethylhexanoic acid (octylic acid: n=8) having a branched chain and, as a metallic source, metallic indium and metallic tin were weighed, added, and mixed together such that the mass ratio between the metallic components (indium:tin) reached 90:10, and this mixture was heated up to 210° C. in a nitrogen atmosphere and retained under stirring for 3 hours. The metallic source was added to the fatty acid at a proportion of 25% by mass in terms of the metallic components. After that, the mixture was heated to 270° C. and further retained under stirring for 3 hours. Due to the heating, ITO microparticles modified by an organic protective group were obtained. The ITO microparticles were cooled to room temperature, and then ITO microparticles having an average particle diameter of 10 nm were produced.

Examples 2 to 10 and Comparative Examples 1 to 3

As fatty acids and metallic sources that were starting raw materials of Examples 2 to 10 and Comparative Examples 1 to 3, kinds shown in Table 2 were selected, and metal oxide microparticles having an average particle diameter shown in Table 2 were produced at heating temperatures shown in Table 2 in the same manner as in Example 1.

added to toluene (20 g) and dispersed using an ultrasonic homogenizer, thereby obtaining a dispersion of the metal oxide microparticles.

<Comparison Test and Evaluation>

The 14 kinds of dispersions obtained in Examples 1 to 10 and Comparative Examples 1 to 4 were applied to surfaces of 50 mm×50 mm transparent soda-lime glass substrates having a thickness of 0.7 mm by spin coating at a rotation rate of 500 rpm for 60 seconds to form coated films, then, furthermore, an epoxy-based resin coating agent (manufactured by JSR Corporation, trade name: GLASSCA) was applied onto the coated films by spin coating at a rotation rate of 2,000 rpm for 60 seconds, and then these films were dried at 120° C. for 20 minutes, thereby forming 14 kinds of infrared-shielding films having a 0.3 μm-thick ITO microparticle-containing layer and a 2 μm-thick overcoat

TABLE 2

| | Fatty acid | | | Metallic source | | | | Metal oxide microparticles | | Heating temperature of mixture (° C.) | Heating temperature of precursor (° C.) |
|---|---|---|---|---|---|---|---|---|---|---|---|
| | Kind | Presence or absence of branched chain | Number of carbon atoms | Kind | Mass ratio | Kind | Mass ratio | Kind | Average particle diameter (nm) | | |
| Example 1 | 2-Ethylhexanoic acid | Present | 8 | Metallic In | 90 | Metallic Sn | 10 | ITO | 10 | 210 | 270 |
| Example 2 | 4-Methylpentanoic acid | Present | 6 | In$_2$O$_3$ | 95 | SnO$_2$ | 5 | ITO | 20 | 220 | 265 |
| Example 3 | Neodecanoic acid | Present | 10 | Metallic In | 90 | Metallic Sn | 10 | ITO | 30 | 230 | 290 |
| Example 4 | Isoundecanoic acid | Present | 12 | Indium hydroxide | 92 | Sn hydroxide | 8 | ITO | 20 | 180 | 275 |
| Example 5 | 3-Methylbutanoic acid | Present | 5 | Metallic In | 90 | Metallic Sn | 10 | ITO | 80 | 190 | 280 |
| Example 6 | 4-Methyloctanoic acid | Present | 9 | Metallic In | 95 | Metallic Sn | 5 | ITO | 50 | 160 | 255 |
| Example 7 | 3,3-Dimethyldodecanoic acid | Present | 14 | Indium hydroxide | 95 | Sb hydroxide | 5 | ATO | 30 | 200 | 280 |
| Example 8 | Neodecanoic acid | Present | 10 | Indium hydroxide | 90 | Sn hydroxide | 10 | ITO | 20 | 220 | 290 |
| Example 9 | 2-Ethylhexanoic acid | Present | 8 | Indium hydroxide | 95 | Sb hydroxide | 5 | AZO | 30 | 170 | 250 |
| Example 10 | 2-Ethylhexanoic acid | Present | 8 | In$_2$O$_3$ | 90 | SnO$_2$ | 10 | ITO | 15 | 210 | 275 |
| Comparative Example 1 | Stearic acid | Absent | 18 | Metallic In | 90 | Metallic Sn | 10 | ITO | 30 | 240 | 310 |
| Comparative Example 2 | Propionic acid | Absent | 3 | Metallic In | 90 | Metallic Sn | 10 | ITO | 40 | 140 | 220 |
| Comparative Example 3 | Hexadecanoic acid | Absent | 16 | Metallic In | 90 | Metallic Sn | 10 | ITO | 100 | 220 | 280 |
| Comparative Example 4 | Stearic acid | Absent | 18 | Metallic In | 90 | Metallic Sn | 10 | ITO | 10 | 70 | 260 |

Comparative Example 4

As a fatty acid raw material, stearic acid (n=18) was warmed to 70° C., and a sodium hydroxide aqueous solution was added thereto and stirred, thereby obtaining a sodium stearate aqueous solution. An indium chloride aqueous solution, which served as a metallic source, was added to this sodium stearate aqueous solution and stirred, thereby obtaining indium stearate. Similarly, a tin chloride aqueous solution was added to the sodium stearate aqueous solution, thereby obtaining tin stearate. The obtained indium stearate and tin stearate were weighed such that the ratio between indium and tin reached 9:1, mixed together, and dissolved in toluene. This toluene solution was dried at a reduced pressure and then heated at 350° C. for 3 hours, thereby producing metal oxide microparticles having an average particle diameter shown in Table 2.

The 14 kinds of metal oxide microparticles obtained in Examples 1 to 10 and Comparative Examples 1 to 4 were respectively cleaned with ethanol and acetone and dried at 50° C., and then each kind of microparticles (2 g) were layer. The light transmittances of the 14 kinds of dispersions and the long-term stability of the dispersions were evaluated respectively. In addition, the light transmittances and light reflectivity of the infrared-shielding films on the 14 kinds of base materials were evaluated respectively. These results are shown in Table 3.

(1) Light Transmittance for Infrared Rays in Dispersion

The 14 kinds of metal oxide microparticles were respectively diluted to a particle concentration of 0.5% by mass, thereby preparing dispersions. For these dispersions, the light transmittances at a wavelength of 600 nm and a wavelength of 1,400 nm were measured by the above-described method using a spectrophotometer (Hitachi High-Tech Corporation, trade name: U-4100).

(2) Long-Term Stability of Dispersion

The 14 kinds of dispersions of metal oxide microparticles were sealed in glass bottles and left to stand in an environment of a temperature of 25° C. and a relative humidity of 50%, and the colors of the liquids in a solution state after 1 month and after 3 months were confirmed. A case where the color of the liquid generally remained the same even after 3 months and no transparent liquid was confirmed in a supernatant was evaluated as "excellent", a case where the color remained the same after 1 month, but the transparent liquid was confirmed in a supernatant of the liquid after 3 months was evaluated as "favorable", and a case where the transparent liquid was confirmed in a supernatant of the liquid after 1 month was evaluated as "poor".

(3) Light Transmittance and Light Reflectivity for Infrared Rays in Base Material For the 14 kinds of infrared-shielding films, the light transmittances at a wavelength of 380 nm, a wavelength of 550 nm, and a wavelength of 780 nm were measured using a spectrophotometer (Hitachi High-Tech Corporation, trade name: U-4100). In addition, similarly, the light reflectivity at a wavelength of 1,500 nm, a wavelength of 2,000 nm, and a wavelength of 2,500 nm was measured.

(4) Maximum Light Reflectivity in Wavelength Range of 1,500 nm to 2,500 nm in Base Material For the 14 kinds of infrared-shielding films, the light reflectivity in a wavelength range of 240 nm to 2,600 nm was measured in the same manner as in the (3), and whether or not the maximum reflectivity was present in a wavelength range of 1,500 nm to 2,500 nm was investigated. When present in a wavelength range of 1,500 nm to 2,500 nm, the maximum reflectivity was evaluated to be "present", and, when not present, the maximum reflectivity was evaluated to be "absent".

In contrast, in the dispersions of the metal oxide microparticles of Examples 1 to 10 produced using the fatty acid having 5 to 14 carbon atoms and having a branched chain, the light transmittances at a wavelength of 800 nm, a wavelength of 950 nm, and a wavelength of 1,100 nm were in a range of 20.4% to 69.5%, changes in the transmittances from the near-infrared range were significant, and the light-shielding property in the near-infrared range was excellent. In addition the long-term stability of the dispersions of these metal oxide microparticles was "favorable" or "excellent".

Furthermore in the infrared-shielding films produced by applying the dispersions of the metal oxide microparticles of Examples 1 to 11, the light transmittances at wavelengths of 380 nm, 550 nm, and 780 nm were in a range of 72.6% to 88.7%, the light-transmitting properties were excellent, the light reflectivity at wavelengths of 1,500 nm, 2,000 nm, and 2,500 nm was in a range of 11.5% to 57.1%, and the maximum light reflectivity was all present in a wavelength range of 1,500 nm to 2,500 nm when the light reflectivity was measured in a wavelength range of 240 nm to 2,600 nm. Therefore it was confirmed that an infrared-shielding effect was strong in the wavelength range of 1,500 nm to 2,500 nm.

Furthermore as is clear from FIG. 1, in a wavelength range of 1,500 nm to 2,500 nm, while the light reflectivity of the base material having an infrared-shielding film for which the dispersion of Comparative Example 1 was used was in a range of 7.8% to 23.4%, the light reflectivity of the

TABLE 3

| | Dispersion | | | | Infrared-shielding film | | | | | | |
|---|---|---|---|---|---|---|---|---|---|---|---|
| | Light transmittance (%) | | | Long-term | Light transmittance (%) | | | Light reflectivity (%) | | | Presence or absence of maximum light reflectivity |
| | 800 nm | 950 nm | 1100 nm | stability | 380 nm | 550 nm | 780 nm | 1500 nm | 2000 nm | 2500 nm | between 1500 nm and 2500 nm |
| Example 1 | 69.1 | 46.7 | 21.8 | Excellent | 82.6 | 85.5 | 88.1 | 14.8 | 46.2 | 43.7 | Present |
| Example 2 | 68.9 | 47.5 | 22.3 | Excellent | 79.6 | 88.7 | 85.5 | 11.5 | 42.8 | 32.1 | Present |
| Example 3 | 68.4 | 49.2 | 23.1 | Excellent | 80.1 | 87.3 | 83.5 | 15.2 | 49.9 | 35.7 | Present |
| Example 4 | 69.5 | 44.8 | 25.0 | Favorable | 72.6 | 86.9 | 85.6 | 12.9 | 44.8 | 40.2 | Present |
| Example 5 | 68.3 | 49.1 | 21.0 | Excellent | 80.6 | 85.9 | 83.6 | 16.7 | 57.1 | 49.3 | Present |
| Example 6 | 69.1 | 50.1 | 22.1 | Excellent | 78.2 | 84.6 | 81.1 | 13.6 | 55.1 | 43.5 | Present |
| Example 7 | 66.9 | 43.9 | 20.4 | Excellent | 77.2 | 81.3 | 80.5 | 14.6 | 52.7 | 40.2 | Present |
| Example 8 | 67.8 | 45.9 | 24.2 | Excellent | 79.1 | 86.6 | 84.9 | 13.3 | 47.1 | 38.5 | Present |
| Example 9 | 65.3 | 42.0 | 23.7 | Excellent | 75.9 | 82.7 | 79.8 | 11.9 | 39.9 | 36.1 | Present |
| Example 10 | 62.3 | 38.1 | 22.6 | Excellent | 79.4 | 86.3 | 82.9 | 15.2 | 54.6 | 40.1 | Present |
| Comparative Example 1 | 73.9 | 60.8 | 37.9 | Favorable | 72.5 | 77.3 | 69.8 | 7.8 | 19.6 | 23.4 | Absent |
| Comparative Example 2 | 74.5 | 62.1 | 33.9 | Poor | 75.1 | 79.3 | 72.1 | 7.4 | 21.1 | 22.4 | Absent |
| Comparative Example 3 | 75.2 | 53.2 | 15.1 | Poor | 67.5 | 72.1 | 68.1 | 8.2 | 19.6 | 22.4 | Absent |
| Comparative Example 4 | 77.6 | 59.5 | 40.2 | Poor | 79.1 | 82.1 | 78.4 | 4.8 | 20.7 | 19.2 | Present |

As is clear from Table 3, in the dispersions of oxide microparticles of Comparative Examples 1 to 4 produced using a fatty acid having less than 5 or more than 14 carbon atoms and not having a branched chain, the transmittances at a wavelength of 800 nm exceeded 70%, and absorption was insufficient in the near-infrared range. In addition, the light reflectivity of the base materials having the corresponding infrared-shielding films did not exceed 10% and was low, particularly, at 1,500 nm. In addition, in Comparative Example 3, the particle diameters of the metal oxide microparticles were large, and the light transmittances of the base material having the corresponding infrared-shielding film were 67.5% and 68.1% respectively at 380 nm and 780 nm, which were a low light transmittances of less than 70%.

base material having an infrared-shielding film for which the dispersion of Example 1 was used was in a range of 14.9% to 46.2%, the light reflectivity of the base material having an infrared-shielding film of Example 1 was higher than the light reflectivity of Comparative Example 1, and the maximum light reflectivity was shown in a wavelength range of 1,500 nm to 2,500 nm.

INDUSTRIAL APPLICABILITY

When a dispersion of the metal oxide microparticles of the present invention is applied to a transparent base material such as glass or a film to form an infrared-shielding film, it is possible obtain an infrared-shielding film having high infrared-shielding performance.

What is claimed is:

1. Fatty acid modified metal oxide microparticles, consisting of: microparticles of a metal oxide; and a fatty acid having 5 or more and 14 or less carbon atoms and having a branched chain which modifies surfaces of the microparticles,
wherein the microparticles consist of oxides of a plurality of kinds of metals selected from the group consisting of Zn, In, Sn, and Sb,
wherein the oxides of a plurality of kinds of metals are:
indium doped tin oxides (ITO), wherein a mass ratio (In:Sn) is from 80:20 to 95:5;
antimony doped tin oxides (ATO), wherein a mass ratio (Sb:Sn) is from 85:15 to 98:2; or
antimony doped zinc oxides, wherein a mass ratio (Zn:Sb) is from 85:15 to 98:2,
wherein the fatty acid is 4-methylpentanoic acid, neodecanoic acid, isoundecanoic acid, 4-methyloctanoic acid, or 3,3-dimethyldodecanoic acid, and
wherein an average particle diameter of the fatty acid modified metal oxide microparticles is 10 nm or more and 80 nm or less.

2. The fatty acid modified metal oxide microparticles according to claim 1, wherein the average particle diameter of the fatty acid modified metal oxide microparticles is obtained by measuring the particle diameters of 300 particles from an image captured using a transmission electron microscope at a magnification of 100,000 times using software and computing the average thereof.

3. The fatty acid modified metal oxide microparticles according to claim 2, wherein the average particle diameter of the fatty acid modified metal oxide microparticles is 10 nm to 50 nm.

4. The fatty acid modified metal oxide microparticles according to claim 3, wherein the average particle diameter of the fatty acid modified metal oxide microparticles is 10 nm to 30 nm.

5. The fatty acid modified metal oxide microparticles according to claim 1, wherein the metal oxides are indium doped tin oxides (ITO), wherein a mass ratio (In:Sn) is from 80:20 to 95:5.

6. A method for producing the fatty acid modified metal oxide microparticles according to claim 1, the method comprising:
a step of preparing a mixture of a plurality of kinds of fatty acid metallic salts by mixing a fatty acid having 5 or more and 14 or less carbon atoms and having a branched chain and a metallic source including a plurality of kinds of metals selected from the group consisting of Zn, In, Sn, and Sb, oxides of the metals, or hydroxides of the metals;
a step of obtaining a metallic soap, which is a precursor, by heating the mixture at a temperature of a melting temperature or higher of the fatty acid and a temperature lower than a decomposition temperature of the fatty acid; and
a step of producing the fatty acid modified metal oxide microparticles by heating the precursor at a temperature of a melting temperature or higher of the precursor and a temperature lower than a decomposition temperature of the precursor,
wherein the fatty acid is 4-methylpentanoic acid, neodecanoic acid, isoundecanoic acid, 4-methyloctanoic acid, or 3,3-dimethyldodecanoic acid.

7. A dispersion for forming an infrared-shielding film, consisting of: a hydrophobic solvent; and the fatty acid modified metal oxide microparticles according to claim 1 which are dispersed in the hydrophobic solvent,
wherein a light transmittance of the dispersion for forming an infrared-shielding film in a wavelength range of 800 nm to 1,100 nm is 20% or more and less than 70%.

8. A method for producing an infrared-shielding film, comprising: a step of forming an infrared-shielding film by applying the dispersion for forming an infrared-shielding film according to claim 7 onto a transparent base material.

9. A base material having an infrared-shielding film, comprising:
a transparent base material; and
an infrared-shielding film formed on the base material,
wherein the infrared-shielding film is produced by the method according to claim 8, and
the base material having an infrared-shielding film has a light transmittance of 70% or more in a wavelength range of 380 nm to 780 nm, a light reflectivity of 10% or more in a wavelength range of 1,500 nm to 2,500 nm, and a maximum value of a light reflectivity in a wavelength range of 1,500 nm to 2,500 nm in a case where the light reflectivity is measured in a wavelength range of 240 nm to 2,600 nm.

10. The base material having an infrared-shielding film according to claim 9, further comprising, on the infrared-shielding film:
a resin film transparent to visible light or a glass layer transparent to visible light.

* * * * *